March 12, 1940.   A. FONTANESI   2,193,688
MOTOR VEHICLE STABILIZING DEVICE
Filed June 29, 1939
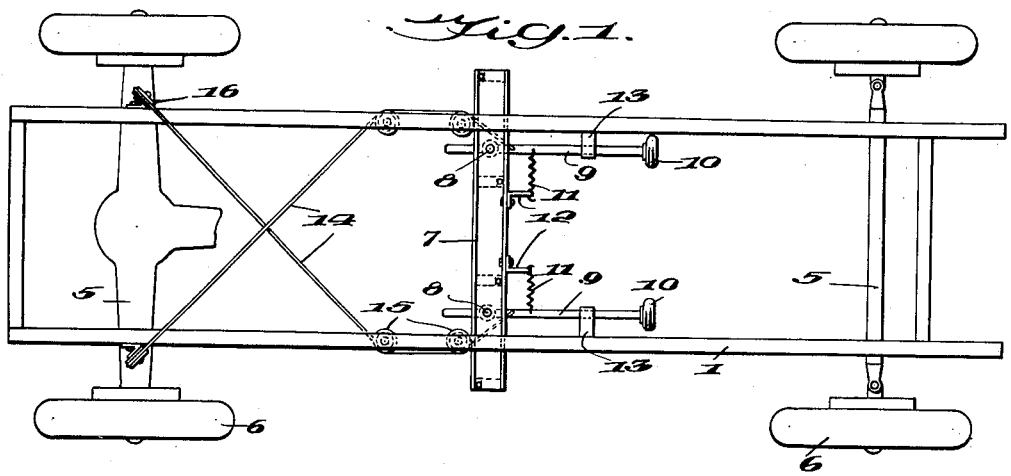
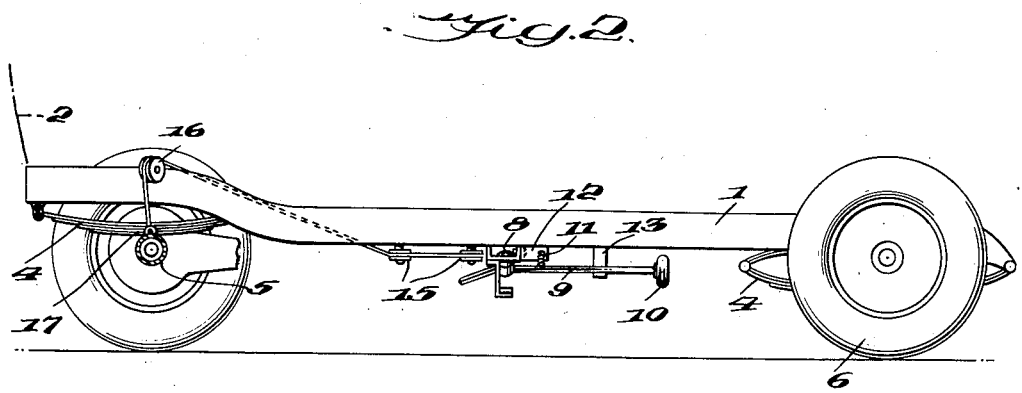
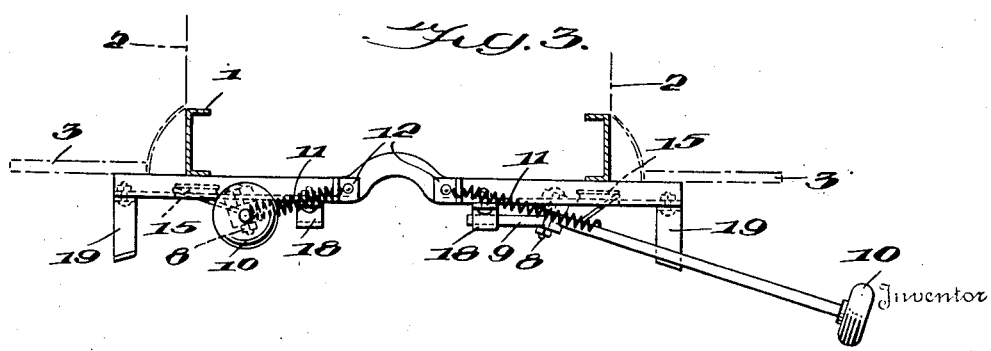

Patented Mar. 12, 1940

2,193,688

UNITED STATES PATENT OFFICE 2,193,688

MOTOR VEHICLE STABILIZING DEVICE

Americo Fontanesi, Weirton, W. Va.

Application June 29, 1939, Serial No. 281,962

10 Claims. (Cl. 280—150)

This invention relates to an improvement in motor vehicle stabilizing devices.

The object of the invention is to prevent the vehicle from upsetting, especially when it is travelling around corners at sufficient speed to cause the wheels on the inside of the curve to rise up from the roadway.

This is accomplished by the provision of a bracing arm which will be moved automatically into proper position to prevent the upsetting of the vehicle when it is travelling at substantial speed around a curve in the road and yet this arm does not project out so far as to be a hazard or to create interference with other vehicles.

In carrying out this object, I have shown a preferred embodiment of my invention in the accompanying drawing, in which:

Fig. 1 is a top plan view of the frame structure and running gear of a motor vehicle showing the invention applied thereto;

Fig. 2 is a side elevation thereof; and

Fig. 3 is a transverse sectional view therethrough showing one of the arms in an extended position.

As shown in the drawing, the usual chassis frame is designated generally by the numeral 1, and supports a body 2 thereon with a laterally projecting running board 3 on each side thereof. The chassis frame is supported on the usual springs 4 from axles 5 carried in turn by the ground engaging wheels 6.

Extending transversely of the chassis frame 1 is a cross bar 7 which extends beneath the running boards 3 and is secured thereto. Pivotally mounted at 8 adjacent opposite ends of the cross bar 7 are bracing arms 9 each of which carries a roller 10 at the free end thereof. The arms 9 normally lie in parallel relation with the side bars of the chassis frame 1, as shown in Fig. 1, where they are resiliently held by springs 11, each of which is connected at one end with the arm 9 and at its opposite end with a bracket 12 mounted on a side of the cross bar 7. When held in their retracted positions, the arms 9 are retained by keepers 13, secured to the side bars of the chassis frame 1 and extending downwardly therefrom in positions to receive the arms 9 when the latter are moved to their retracted positions.

The arms 9 are adapted to swing outward from the positions shown in Fig. 1 to positions outside of the wheel lines at opposite sides of the vehicle for which purpose cables 14 are attached respectively to the arms 9, and extend therefrom over guide pulleys 15, mounted on the chassis frame 1, thence to the opposite side of the chassis frame over a pulley 16 secured thereon, and downward therefrom to the rear axle housing 15, to which the free end of each of the cables 14 is attached as indicated at 17. The cables 14 are thus arranged in crossed relation, extending from one side of the rear of the frame to the arm 9 at the opposite side thereof.

It will be evident that when the vehicle is travelling around a curve in the road at a substantial speed, the body 2 tends to lean toward the outer side of the curve, which expands the springs 4 on the inside of the curve, thus lengthening the distance between the connecting point 17 and the pulley 16 on the inside of the curve, which will shorten the cable 14 passing thereover sufficiently to swing the connected arm 9 outward sufficiently to brace the vehicle and prevent it from upsetting. This arm will swing outwardly to its bracing position only when there is an appreciable swaying of the body that would cause the wheels on the inside of the curve to rise up from the road surface. Sufficient slack or lost motion may be provided in the cables 14, so they will not function to swing the arms 9 outward, except upon extreme swaying of the body, although the normal swaying motion of the body will not exert sufficient pull on the cables to cause an appreciable outward movement against the tension of the springs 11.

As shown in Fig. 3, the pivots 8 are arranged in slanting positions, whereby the outward swinging movement of the arms 9 will cause the latter to assume inclined positions, as shown at the right in Fig. 3, disposing the roller 10 close to the road surface which it will engage almost immediately that the frame tends to rise up and otherwise causing an upsetting of the vehicle. Keepers 18 and 19 are provided on the underside of the cross bar 7 in positions to receive each of the arms 9 when the latter is moved to its extended position to brace the same and to relieve the pivot 8 from undue strain.

It will be evident that only one arm at a side of the vehicle will be moved outward at a time, since the arm on the inner side of the curve will not be moved since the vehicle sways in one direction only.

In this way, an effective anti-upsetting device is provided for the vehicle, which will prevent it from turning over in passing around curves in the road at substantial speed which would cause material swaying of the body. This functions automatically and effectively, and yet it does not project outwardly so far as to interfere with other vehicles. It may be applied to the vehicle at relative small cost and will effect a substantial saving in insurance due to the added safety provided, as well as materially reducing the hazard of driving motor vehicles.

I claim:

1. In a motor vehicle, the combination of a running gear, a body structure mounted thereon for relative vertical movement, bracing means mounted on the vehicle normally in a retracted position for movement to an extended bracing position, and means for automatically moving said bracing means to the extended position, said means being responsive to and actuated by substantial relative movement in one direction between the body structure and running gear.

2. In a motor vehicle, the combination of a running gear, a body structure mounted thereon for relative vertical movement, bracing means at opposite sides of the vehicle and normally in a retracted position thereon, said bracing means being mounted for movement to extended positions relative to the vehicle, and means for automatically moving said bracing means to said extended positions, said means being responsive to and actuated by substantial relative vertical movement between the body structure and the running gear.

3. In a motor vehicle, the combination of a wheeled running gear, a body chassis spring supported on the running gear, bracing means mounted on the body chassis normally in a retracted position and extensible to a bracing position laterally thereof, adapted to engage a road surface at each opposite side, and means connected between the running gear and body chassis for automatically moving said bracing means to extended positions in response to relative vertical movement in one direction of the body chassis and running gear.

4. In a motor vehicle, the combination of a wheeled running gear, a body chassis spring supported on the running gear for relative vertical movement, arms pivotally mounted on the chassis at each opposite side thereof in position for extensible movements to points laterally thereof for bracing the body chassis against upsetting, and means connected between the running gear and body chassis for automatically moving said arms alternately to extended positions in response to substantial swaying movement of the chassis relative to the running gear.

5. In a motor vehicle, the combination of a wheeled running gear, a body chassis spring supported on the running gear for relative vertical movement, arms pivotally mounted on the chassis at each opposite side thereof in positions for extensible movements to points laterally thereof for bracing the body chassis against upsetting, resilient means connected with the arms normally tending to hold the same in retracted positions, and cables connected with the arms and extending therefrom between the body chassis and running gear for automatically moving the arms to extended positions alternately upon substantial swaying movement of the body chassis in either direction.

6. In a motor vehicle, the combination of a wheeled running gear, a body chassis spring supported on the running gear for relative vertical movement, arms pivotally mounted on the chassis at each opposite side thereof in positions for extensible movements to points laterally thereof for bracing the body chassis against upsetting, resilient means connected with the arms normally tending to hold the same in retracted positions, cables connected with the arms and extending therefrom between the body chassis and running gear for automatically moving the arms to extended positions alternately upon substantial swaying movement of the body chassis in either direction, said cables being arranged in crossed relation, guide means on the body chassis for directing the movement of the cables, and means on the body chassis for receiving and bracing the arms in extended positions.

7. In a motor vehicle, the combination of a running gear, a body structure spring-mounted thereon, an arm disposed substantially beneath the body structure at one side thereof, means pivotally mounting said arm on an approximately vertical pivot intermediate the length of the arm for outward swinging movement of an end portion thereof relative to the body structure, and means connected with the opposite end portion of said arm and being actuated in response to substantial swaying movement of the body structure for causing said swinging movement of the arm.

8. In a motor vehicle, the combination of a wheeled running gear, a body structure spring-mounted thereon for relative vertical movement, said body structure including a chassis frame, an arm disposed substantially beneath the chassis frame, means pivotally mounting said arm on the frame on an approximately vertical pivot intermediate the length of the arm for outward swinging movement of an end portion thereof from a retracted position relative to the frame, keepers mounted on the frame in position to receive the respective end portions of the arm in retracted position thereof, and means connected with said arm and actuated in response to substantial swaying movement of the body structure for causing swinging movement of the arm to an extended position.

9. In a motor vehicle, the combination of a wheeled running gear, a body structure spring-mounted thereon for relative vertical movement, said body structure including a chassis frame, an arm disposed substantially beneath the chassis frame, means pivotally mounting said arm on the frame on an approximately vertical pivot intermediate the length of the arm for outward swinging movement of an end portion thereof from a retracted position relative to the frame, and means connected between the running gear and body structure and with the arm for swinging said arm to an extended position automatically in response to relative vertical movement of the running gear and body structure.

10. In a motor vehicle, the combination of a wheeled running gear, a body chassis spring supported on the running gear for relative vertical movement, an arm pivotally mounted on the chassis at one side thereof in position for extensible movement to a point laterally thereof for bracing the body chassis against upsetting, resilient means connected with the arm normally tending to hold the same in a retracted position, and a cable connected with the arm and extending therefrom between the body chassis and running gear for automatically moving the arm to an extended position upon substantial swaying movement of the body chassis in one direction.

AMERICO FONTANESI.